United States Patent [19]
Lipchik et al.

[11] 3,758,203
[45] Sept. 11, 1973

[54] EYEGLASSES FRAME CONSTRUCTION

[75] Inventors: Harold Lipchik, Encino; Ernest G. Racicot, La Crescenta, both of Calif.

[73] Assignee: Halco Industries, Inc., Glendale, Calif.

[22] Filed: Jan. 27, 1972

[21] Appl. No.: 221,159

[52] U.S. Cl. ................... 351/98, 351/130, 351/131, 351/132, 351/133
[51] Int. Cl. ........ G02c 1/08, G02c 5/02, G02c 5/12
[58] Field of Search ..................... 351/98, 130, 132, 351/133, 131

[56] References Cited
UNITED STATES PATENTS
| | | | |
|---|---|---|---|
| 2,380,281 | 7/1945 | Whipple | 351/98 |
| 2,243,770 | 5/1941 | Merney | 351/132 |
| 2,148,397 | 2/1939 | Bock | 351/130 |

*Primary Examiner*—David Schonberg
*Assistant Examiner*—Paul A. Sacher
*Attorney*—C. A. Miketta et al.

[57] ABSTRACT

A one-piece front is stamped out of aluminum material with a central bridge portion interconnecting a pair of lens rim portions having inner-peripheral grooves for receiving beveled edge lenses. The bridge portion is split by a longitudinally extending narrow gap between upper and lower bridge segments to facilitate insertion of the lenses, retention of the lense therein being effected by mechanical fastening means associated with the bridge segments. One of the bridge segments is vertically split to allow insertion and retention of each lense independent from the other. A combination nose pad mounting and bridge masking means is of a weldable material and has a plate portion overlying and concealing the bridge gap and split and has a pair of nose pads welded via associated nose pad arms thereto. A tang extending laterally of the masking plate is received within a slot formed in the bridge segments in marginal areas adjacent said gap and said mechanical fastening means passes through said tang to hold the construction in assembled relation.

8 Claims, 4 Drawing Figures

PATENTED SEP 11 1973  3,758,203

EYEGLASSES FRAME CONSTRUCTION

BACKGROUND OF THE INVENTION

The frame construction for eyeglasses have been made in a variety of ways heretofore out of metal and plastic. Older style glasses have been made by plating or drawing a precious metal, such as gold, over an eye wire made of a weldable metarial such a nickel. The associated nose pad mounting arms, temple hinges, etc. have been merely welded thereto. The lens rims therefore have been split in various locations to facilitate the insertion of lenses and means have been provided for closing such slits to retain the lenses therein. Such means have generally included internally threaded tubular members attached to upper and lower portions of the rims, as by welding, and fastened together by means of a threaded screw.

In the case of plastic frames, the front may be formed of one piece and the lens portions distorted, with or without the addition of heat, to facilitate the insertion of lenses therein. Generally, any nose pads provided have been formed integrally of the plastic front itself. The plastic eyeglasses frame constructions heretofore have not only been generally limited to the use of such integral nose pad constructions, but are not readily decorated or worked to give the appearance of the more expensive eyeglasses, such as the gold clad frames, or as in the case of the more recently utilized anodized aluminum fronts.

Aluminum eyeglasses frames are less expensive than the aforementioned gold clad eye wire frames and can be anodized and/or painted to give a gold, silver or other colored metallic appearance. In addition, aluminum can be readily and easily worked to provide high relief, sculptured designs in the front and temples whereas the metal clad eye wire constructions are not. However, it is very difficult to weld, braise or solder aluminum to itself or to other metals. Therefore, nose pads, temple hinges and decorative trims or plaques are not readily welded, braised or soldered to aluminum fronts. Further, it is difficult to grind lenses to fit snugly within aluminum fronts which are stamped by mass production methods without providing a split in the lens rims to allow insertion of the lenses. Such split of the lens rims requires the provision of some means for closing the split and holding the aluminum fronts in an assembled relation.

It is therefore the primary object of the present invention to disclose and provide an eyeglasses frame construction utilizing a one-piece front stamped out of a material, such as aluminum, which is not easily welded and which is provided with a nose pad mounting means made of a weldable material for welding nose pads thereto and a mechanical means for connecting such nose pad mounting means to the one-piece front.

It is another object of the present invention to disclose an eyeglasses frame construction as in the foregoing object wherein the bridge portion of the front is split to facilitate insertion of lenses individually therein and wherein the nose pad mounting means conceals such split.

It is a still further object of the present invention to disclose and provide an eyeglasses frame construction wherein a one-piece front may be stamped of aluminum, split in the bridge portion to facilitate the reception of lenses therein, be provided with means for concealing or masking such split and have mechanical connecting means for holding nose pads, the concealing means and the split bridge portions together in an assembled relation while retaining the lenses within the front.

SUMMARY OF THE INVENTION

Generally stated, the eyeglasses frame construction, in accordance with the present invention, includes a one-piece front stamped out of aluminum with a central bridge portion interconnecting a pair of lens rim portions. A pair of nose pads are mounted by a nose pad mounting means in spaced apart opposed relation suitable for resting upon the nose of the user of the eyeglasses employing the present construction. Mechanical means are provided for connecting such nose pad mounting means to the front.

More particularly, the central bridge portion of the one-piece aluminum front is split by a longitudinal gap extending thereacross, the bridge being divided into upper and lower segments to facilitate insertion of the eyeglass lenses within the front rim portions. One of the bridge segments is vertically split to allow insertion and retention of each lense independent from the other. The nose pad mounting means include a mask or bridge covering plate for concealing the gap in the bridge when the nose pad mounting means is assembled thereto. A tang extending laterally of the mask or bridge plate is positioned within a slot-like aperture formed in opposed marginal areas of the bridge segments adjacent said gap into which the tang is inserted. The fastening means for contracting the bridge segments toward one another and narrowing the aforementioned gap are associated with such tang to also retain the combination nose pad mounting and bridge gap masking means assembled to said front as well as to retain the eyeglasses lenses within said front lens portions.

A more complete understanding of the eyeglasses frame construction in accordance with the present invention, as well as the recognition of further objects and advantages thereof, will be afforded to those skilled in the art from a consideration of the following detailed explanation of a preferred exemplary embodiment thereof.

Reference will be made to the appended sheet of drawings in which:

DESCRIPTION OF THE PREFERRED EMBODIMENT

In the preferred exemplary embodiment of eyeglasses frame construction, in accordance with the present invention, the chassis or front is indicated generally at 10 and includes a central bridge portion, indicated generally at 11, interconnecting a pair of lens receiving rim portions, indicated generally at 12 and 13. The front indicated generally at 10, is preferably stamped out of aluminum in a one-piece integral configuration.

Figure 1:
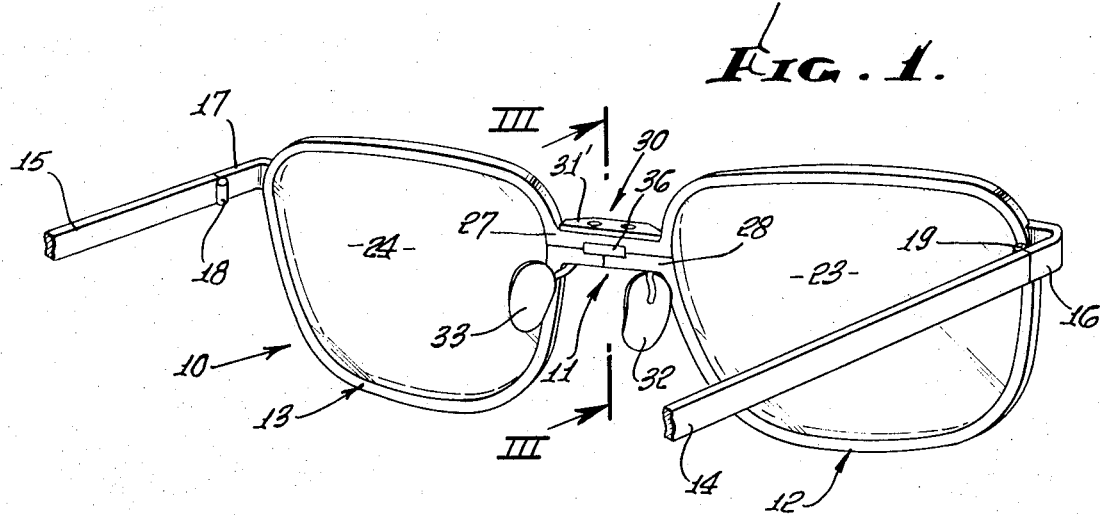
FIG. 1 is a perspective view of the rearward side of a preferred exemplary embodiment of eyeglasses frame construction in accordance with the present invention.
Figure 2:
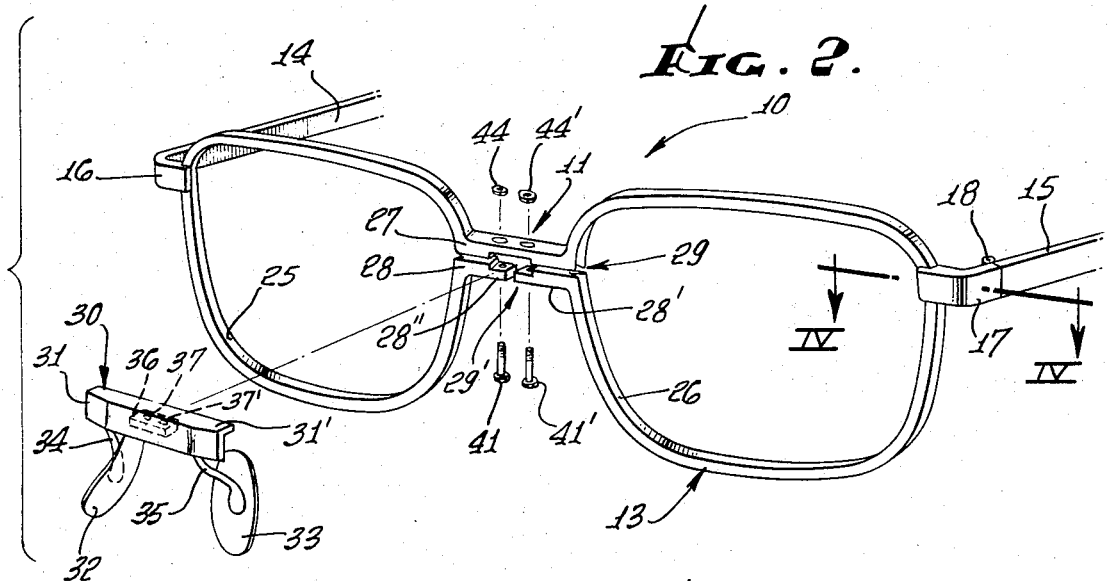
FIG. 2 is an exploded, perspective view of the forward sides of the construction of FIG. 1.
Figures 3, 4:
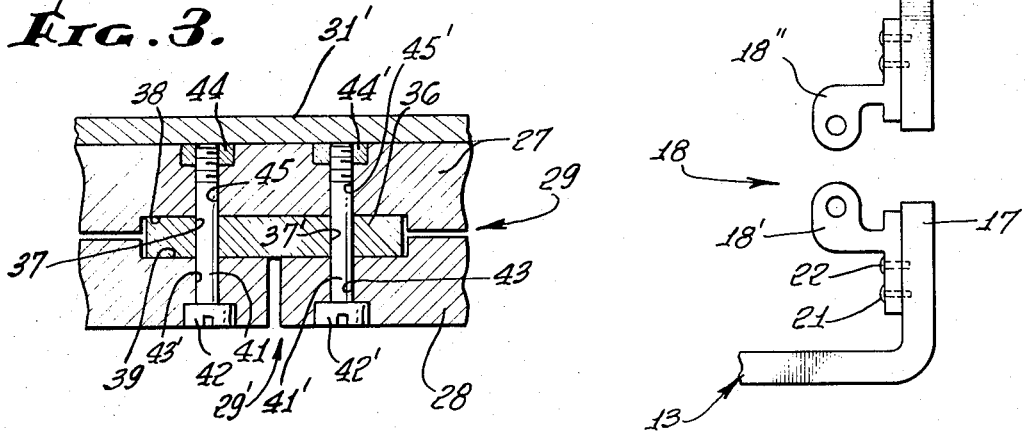
FIG. 3 is a detailed section view of the construction of FIG. 1 taken therein along the vertical plane of numeral III—III and FIG. 4 is a detailed section view of the construction of FIG. 2 taken therein along the horizontal plate of numeral IV—IV.

Temples 14 and 15, which also may be made of aluminum, are connected to end pieces 16 and 17 of the front, by conventional hinges 18 and 19, respectively, as seen in FIGS. 1 and 2. Each of the end pieces 16 and 17 of the exemplary embodiment is formed integrally of the aluminum front and bent into the configuration shown. Blind rivets, as 21 and 22 in FIG. 4, may be formed integrally of the end pieces for receiving the associated hinge halves, as 18 in FIG. 4. The other hinge halves, as 18', 18'' in FIG. 4, are fastened to the temples 14 and 15. The hinge halves may be assembled together in conventional manner, as by the use of a screw pairing through their common center apertures.

As seen in FIG. 1, lenses 23 and 24 are normally retained within the lens rim portions 12 and 13. Rim portions 12 and 13 preferably include beveled grooves 25 and 26 about the periphery of their inner openings for receiving and retaining the lenses therein. Lenses 23 and 24, as in conventional manner, are each provided with a beveled edge for mating reception within the grooves 25 and 26.

As best seen in FIG. 2, the central bridge portion indicated generally at 11, of the exemplary embodiment of eyeglasses frame construction is cut, as by a saw cut, generally horizontally thereacross separating the bridge portion into upper and lower segments 27 and 28 having a gap, indicated generally at 29, extending through and across the bridge portion between said segments. By thus splitting the bridge portion, the eyeglasses front may be expanded to facilitate the insertion of lenses 23 and 24 into the lens rim portions indicated generally at 12 and 13.

In the preferred exemplary embodiment of eyeglasses front construction, one of the bridge segments is vertically split to facilitate independent insertion or removal of each lense. As best seen in FIGS. 2 and 3, the lower bridge segment 28 is divided into left and right hand portions 28' and 28'', respectively. Each lense rim portion 12 and 13 is thereby independently operable to insert or remove a lense 23, 24 relative thereto.

As particularly contemplated within the present invention, nose pad mounting means are provided for mounting a pair of nose pads in spaced apart, opposed position suitable for resting upon the nose of a user of the eyeglasses and the pad mounting means is mechanically connected to the aluminum front. Therefore, as explained hereinafter in more detail, the nose pads may be secured to their mounting means by welding, braising or soldering, or other suitable metal bounding means, and the pad mounting means in turn is mechanically connected to the aluminum material front which is not easily welded, braised or soldered. The term welded, as used herein, is meant to include such metal fusion and bonding processes as braising and soldering as well as the generally known arc welding process.

In the preferred exemplary embodiment, such nose pad mounting means is indicated generally at 30 and includes a body or plate portion 31 which is preferably made of a weldable material such as nickel or nickel alloys. Plate 31 may be plated, painted or be otherwise treated to match the aluminum front to which it is attached as hereinafter explained. As best seen in FIG. 2, a pair of nose pads 32 and 33, which may be made of a resilient plastic material, are secured to nose pad arms 34 and 35, respectively, arms 34 and 35 can be formed integrally of plate 31, or as in the preferred exemplary embodiment, be welded to the readily weldable material plate 31. Further, in the preferred exemplary embodiment, and in accordance with the present invention, the plate portion of the nose pad mounting means is provided to mask or cover the bridge portion, indicated generally at 11, so that the gap, indicated generally at 29, and the vertical split, indicated generally at 29', are entirely concealed along the front face of the chasses or front, indicated generally at 10. A top plate portion or flange 31' is preferably provided to mask the fastening means associated with the bridge as hereinafter explained.

Means are provided for holding the nose pad mounting means positioned to and retained upon the bridge portion, indicated generally at 11, in the preferred exemplary embodiment, such means include a mechanical interconnection between tang means provided upon the nose mounting means and a recess or slot provided in a central portion of the bridge portion of the front. As best seen in FIG. 2, such tang means include the provision of a laterally extending generally flat tang 36 having a pair of apertures 37 and 37' therethrough. The upper and lower segments 27 and 28 of the bridge portion, as best seen in FIG. 3, are provided with recesses 38 and 39 in a central portion thereof in marginal areas of the segments adjacent the gap, indicated generally at 29, to provide a slot-like opening through the portion shaped to receive and position tang 36 therein. The nose pad mounting and bridge masking means, indicated generally at 30, may therefore be easily assembled to the eyeglasses front, after the lenses have been inserted therein, by merely sliding tank 36 into the slot formed between the bridge segments by the recesses 38 and 39.

Means are provided for holding the combination nose pad mounting and bridge masking means, according to the present invention, to the eyeglasses front, and the lenses within the lens rims as well, by a mechanical interconnection therebetween. In the exemplary embodiment, such holding means includes the provision of mechanical fasteners extending through the upper and lower segments 27, 28 of the bridge portion and tang 36. As best seen in FIG. 3, such fastening means includes a pair of threaded screws 41, 41' having head portions 42, 42' adapted to seat within recessed bores 43, 43' provided in the lower segment 28. Internally threaded, metallic (such as steel) collars or tubes 44, 44' are provided within recessed bores 45, 45' provided in the upper bridge segment 27. With tang 36 positioned in the slot-like aperture formed by recesses 38 and 39, and the tang apertures 37, 37' aligned with bores 43, 43' and 45, 45', the screws 43, 43' may be passed through the upper segment, tang and lower segment into the associated steel collars independent of one another and turned down relative thereto to hold the combination nose pad mounting and bridge masking means, indicated generally at 30, to the eyeglasses front and to retain lenses 23 and 24 within the lens rims indicated generally at 12 and 13. The mechanical connection thus effected at the bridge portion of the eyeglasses frame construction of the present invention, retains all of the parts of the frame construction in assembled relation. When it is desired to replace a particular lens, the fastening means, indicated generally at 40, may be released and the individual lens replaced without disturbing the retention of the other lens if desired.

Further, the provision of the combination nose pads mounting and bridge masking means of the preferred exemplary embodiment, indicated generally at 30, allows the use of a one-piece aluminum frame which can simulate the more expensive eyeglasses frame construction wherein eye wires are gold clad and the nose pads and associated arms are welded to the eye wires.

By virtue of the eyeglasses frame construction of the present invention, eyeglasses may be made with stamped aluminum fronts and still retain the advantages and comfort of separately formed nose pads of a comfortable resilient plastic material which are mountable to the front in a secure lasting and aesthetically pleasing manner.

Having thus described a preferred exemplary embodiment of the eyeglasses frame construction, in accordance with the present invention, it should be noted by those skilled in the art that various modifications, alterations and adaptions thereof may be made within the scope and spirit of the present invention which is defined within the following claims.

We claim:

1. In an eyeglasses frame construction having a one-piece front stamped out of aluminum with a central bridge portion interconnecting a pair of lens rim portions, the improvement comprising the provision of:

bridge means defining a longitudinal gap extending completely across and completely through said bridge portion dividing it into upper and lower segments thereof to facilitate manipulation of said front for insertion of eyeglass lenses within said rim portions;

a bridge plate of weldable material overlying said bridge portion and concealing said gap, said plate having a pair of opposed nose pads mounted thereto by pad arms welded to said plate; and means for holding said plate to said bridge portion with said nose pads positioned below said bridge portion, said holding means also holding said upper and lower segments together for closing said gap for retaining said lenses within said rim portions.

2. The improvement in eyeglasses frame construction of claim 1 wherein:

said lower bridge segment is divided into independently movable left and right hand portions to facilitate independent retention of each of said lenses within said rim portions.

3. The improvement in eyeglasses frame construction of claim 1 wherein:

said bridge plate includes a body portion overlying the forward surfaces of said bridge segments and a top flange overlying the top surface of said upper bridge segment.

4. The improvement in eyeglasses frame construction of claim 1 wherein:

said bridge plate is provided with laterally extending tang means for extending into said gap between said upper and lower bridge segments for positioning said plate on said bridge portion, said tang means is provided with an aperture therethrough within said bridge portion, said bridge portion is provided with a vertical bore therethrough, said tang aperture being aligned with said bore, and said means for holding said plate to said bridge includes a fastening member lying within said bore through said aperture.

5. The improvement in eyeglasses frame construction of claim 4 wherein:

said upper and lower bridge segments are provided with a pair of opposed slot-like recesses in marginal areas thereof adjacent said gap for receiving said tang means for positioning said tang means and plate relative to said front and for allowing said gap to be narrowed upon tightening of said holding means to retain said lenses within said front rim portions.

6. An eyeglasses construction comprising:

a one-piece front including a central bridge portion interconnecting a pair of lens rim portions;

bridge means defining a gap completely through and extending completely across said bridge portion to facilitate the insertion of eyeglasses lenses into said lens rim portions;

a bridge face plate overlying said bridge portion and concealing said gap, said face plate having tang means extending laterally into said gap for mounting and positioning said plate in said bridge portion; and fastening means extending through said bridge and tang behind said plate for narrrowing said gap and holding said plate and lenses in assembled relation to said front.

7. In an eyeglasses frame construction having a one-piece front formed out of a material which is not readily bonded to other materials by welding and includes a bridge portion interconnecting a pair of lens receiving rim portions, the improvement comprising the provision of:

a nose pad mounting means for mounting a pair of nose pads in spaced apart, opposed position suitable for resting upon the nose of a user of said construction; and mechanical means extending through said mounting means and at least a part of said bridge portion for connecting said nose pad mounting means to said front by a mechanical interconnection between said front and said nose pad mounting means said bridge portion is split generally horizontally into two segments thereof to facilitate insertion of lenses into said rim portions, and said nose pad mounting means includes a masking plate for overlying and concealing said bridge portion where it is split.

8. The improvement in eyeglasses frame construction of claim 7 wherein:

said masking plate includes a laterally extending protrusion positioned between said two segments where said bridge portion is split, and said mechanical means includes means for holding said protrusion between said two segments.

\* \* \* \* \*